United States Patent
Kumar et al.

(10) Patent No.: US 8,607,243 B2
(45) Date of Patent: Dec. 10, 2013

(54) DYNAMIC OPERATING SYSTEM OPTIMIZATION IN PARALLEL COMPUTING

(75) Inventors: Prathiba Kumar, Tamilnadu (IN); Varun Mallikarjunan, Bangalore (IN); Rajan Ravindran, Karnataka (IN); Satish Kumar Sadasivam, Tamilnadu (IN)

(73) Assignee: International Business Machines Corporation, Armonk, NY (US)

(*) Notice: Subject to any disclaimer, the term of this patent is extended or adjusted under 35 U.S.C. 154(b) by 66 days.

(21) Appl. No.: 13/237,035

(22) Filed: Sep. 20, 2011

(65) Prior Publication Data

US 2013/0074090 A1    Mar. 21, 2013

(51) Int. Cl.
*G06F 9/46* (2006.01)

(52) U.S. Cl.
USPC .......................................................... 718/104

(58) Field of Classification Search
None
See application file for complete search history.

(56) References Cited

U.S. PATENT DOCUMENTS

| | | | | |
|---|---|---|---|---|
| 7,698,707 | B2* | 4/2010 | Accapadi et al. | 718/102 |
| 2005/0102677 | A1* | 5/2005 | Gootherts | 718/105 |
| 2006/0242642 | A1* | 10/2006 | Yamamura et al. | 718/100 |
| 2010/0153966 | A1* | 6/2010 | Arimilli et al. | 718/105 |

* cited by examiner

*Primary Examiner* — Gregory A Kessler
(74) *Attorney, Agent, or Firm* — Steven M. Greenberg, Esq.; Carey, Rodriguez, Greenberg & O'Keefe

(57) ABSTRACT

A method for dynamic optimization of thread assignments for application workloads in an simultaneous multi-threading (SMT) computing environment includes monitoring and periodically recording an operational status of different processor cores each supporting a number of threads of the thread pool of the SMT computing environment and also operational characteristics of different workloads of a computing application executing in the SMT computing environment. The method further can include identifying by way of the recorded operational characteristics a particular one of the workloads demonstrating a threshold level of activity. Finally, the method can include matching a recorded operational characteristic of the particular one of the workloads to a recorded status of a processor core best able amongst the different processor cores to host execution in one or more threads of the particular one of the workloads and directing the matched processor core to host execution of the particular one of the workloads.

4 Claims, 2 Drawing Sheets

DYNAMIC OPERATING SYSTEM OPTIMIZATION IN PARALLEL COMPUTING

BACKGROUND OF THE INVENTION

1. Field of the Invention

The present invention relates to parallel computing in general and more particularly to operating system optimization in a parallel computing environment.

2. Description of the Related Art

Parallel computing is a form of computation in which many calculations are carried out simultaneously, operating on the principle that large problems can often be divided into smaller ones, which are then solved concurrently. There are several different forms of parallel computing, for example bit-level, instruction level, data, and task parallelism. Parallelism has been employed for many years, mainly in high-performance computing. More recently, parallel computing has become the dominant paradigm in computer architecture, mainly in the form of multicore processors.

Parallel computers can be classified according to the level at which the computing hardware platform supports parallelism—with multi-core and multi-processor computers having multiple processing elements within a single machine, while clusters and grids using multiple computers to work on the same task. Specialized parallel computer architectures are sometimes used alongside traditional processors, for accelerating specific tasks. The advent of simultaneous multi-threading (SMT) operating environments specifically supports parallelism by executing more than one thread on a processor core and assigning different tasks of a computer program to different threads.

Thus, managing the assignment and execution of different processing tasks to different threads of execution can in of itself require sophisticated programmatic logic. While more programs can run simultaneously in an SMT environment, the performance of some of programs may show some degradation. Consequently, administrators become unsure about the effectiveness of SMT for workloads of interest and ultimately disable intelligent usage of SMT. Ironically, based upon the exhibited degradation of the workloads of interest, the administrator subsequent to SMT deactivation can experience a decrease in throughput of the workload of interest while the performance of the individual applications of the workload of interest are ensured.

Even still, in large enterprise level systems, the numerous tasks running on huge systems face performance issues that often cannot be recreated for troubleshooting, but can most-often be traced to non-optimal utilization of the system. In this regard, not only are the workloads varying constantly, but also the characteristics of a single application can vary from time to time. Of note, program characteristics determine whether leveraging of SMT will help increase to throughput or if the use of SMT will degrade performance of a subject workload. Given the dynamic nature of the workloads that run on the system, the SMT control has to be dynamic as well. Notwithstanding, current methodologies permit either a system-wide activation or de-activation of SMT and do not allow for a partial activation, or even dynamic SMT control. Consequently, critical resources of the computing environment are likely to be wasted.

BRIEF SUMMARY OF THE INVENTION

Embodiments of the present invention address deficiencies of the art in respect to workload optimization in an SMT environment and provide a novel and non-obvious method, system and computer program product for dynamic optimization of thread assignments for application workloads in an SMT computing environment. In an embodiment of the invention, a method for dynamic optimization of thread assignments for application workloads in an SMT computing environment can include monitoring and periodically recording an operational status of different processor cores supporting one or more threads comprising a thread pool of the SMT computing environment and also operational characteristics of different workloads of a computing application executing in the SMT computing environment. In this regard, the operational characteristics can include a number of clock ticks consumed by a corresponding one of the workloads, a higher number of clock ticks indicating a higher degree of activity. Additionally, the operational characteristics can include a measurement of cycles per instruction (CPI) consumed by a corresponding one of the workloads and a variance in measurements of CPI consumed by the corresponding one of the workloads over time, a lower variance indicating greater stability in operational characteristics or behavior.

The method further can include identifying by way of the recorded operational characteristics of the different workloads a particular one of the workloads demonstrating a threshold level of activity. Optionally, a particular one of the workloads can be identified by way of the recorded operational characteristics of the different workloads as demonstrating both operational stability and a threshold level of activity. Finally, the method can include matching a recorded operational characteristic of the particular one of the workloads to a recorded status of a processor core best able amongst the different processor cores to host execution of the particular one of the workloads in one or more of the threads in the thread pool and directing the matched processor core to host execution of the particular one of the workloads. In one aspect of the embodiment, it can be determined that no one of the processor cores is available to host the execution of the particular one of the workloads, and in response, an existing assignment of ones of the different workloads to corresponding ones of the processor cores and/or the number of threads hosted (enabled) on one or more of the cores can be re-arranged to optimize matching of the recorded operational characteristics of the ones of the different workloads to the recorded operational status of the processor cores.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for dynamic optimization of thread assignments for application workloads in an SMT computing environment. In accordance with an embodiment of the invention, operational characteristics of application workloads executing within an SMT computing environment can be monitored and recorded. Concurrently, the operational status of different processor cores of a processor pool for the SMT computing environment can be monitored and recorded. Responsive to detecting a particular application workload achieving an threshold activity level indicative both of operational stability and a high degree of activity ("hotness"), the recorded operational characteristics of the particular application workload can be mapped to the operational status of the SMT computing environment to identify an available one of the processor cores optimally matched for the particular application workload. Thereafter, the particular application workload can be assigned to the identified available processor core. Of note, to the extent that an available processor core cannot be mapped to the particular application workload, existing workload assignments for the different processor cores in the processor pool can be re-organized to accommodate an optimally largest number of workloads demonstrating an activity level beyond the predetermined threshold.

Figure 1:
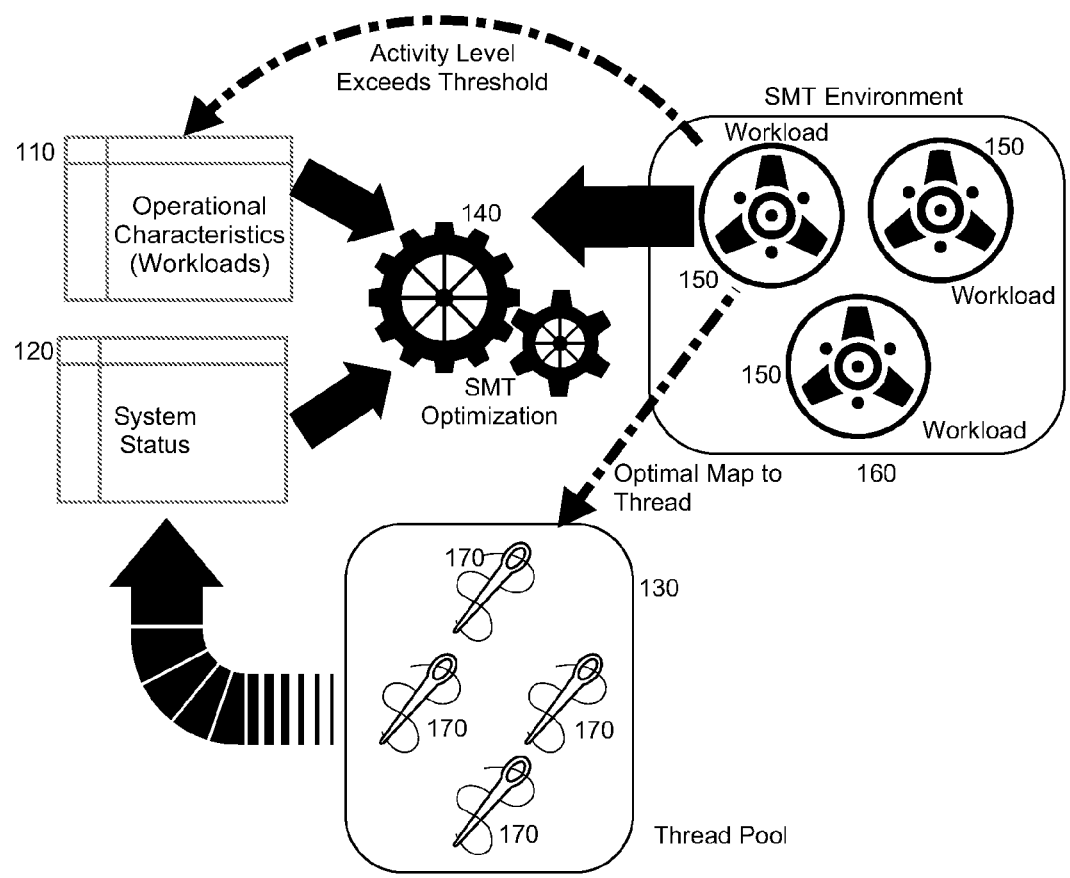
FIG. 1 is a pictorial illustration of a process for dynamic optimization of thread assignments for application workloads in an SMT computing environment.

In further illustration, FIG. 1 is a pictorial illustration of a process for dynamic optimization of thread assignments for application workloads in an SMT computing environment. As shown in FIG. 1, the status 120 of a set of processor cores 130 hosting different processing threads 170 can be monitored and recorded. Likewise, the operational characteristics 110 of different workloads 150 in an SMT environment 160 can be monitored and recorded. SMT optimization logic 140 can inspect the operational characteristics 110 of the workloads 150 to identify ones of the workloads 150 demonstrating both operational stability and also a requisite degree of high activity ("hotness").

Upon identifying a particular one of the workloads 150 demonstrating operational stability and the requisite degree of hotness, the SMT optimization logic 140 can compare the operational characteristics 110 of the particular one of the workloads 150 to the status 120 of the processor cores 130 to identify a particular one of the processor cores 130 able to support one or more threads 170 to host the operation of the particular one of the workloads 150. To the extent none of the processor cores 130 are available and suitable to support one or more threads 170 to host the operation of the particular one of the workloads 150, the assignment of existing ones of the workloads 150 to corresponding threads 170 in the processor cores 130 can be re-arranged by the SMT optimization logic 140 according to the current status 120 of the processor cores 130 and the operational characteristics 110 of the workloads 150 in order to optimally match the workloads 150 to the processor cores 130 thereby accounting both for the contemporaneous status 120 of the processor cores 130 and also the contemporaneous operational characteristics 110 recorded for the workloads 150.

Figure 2:
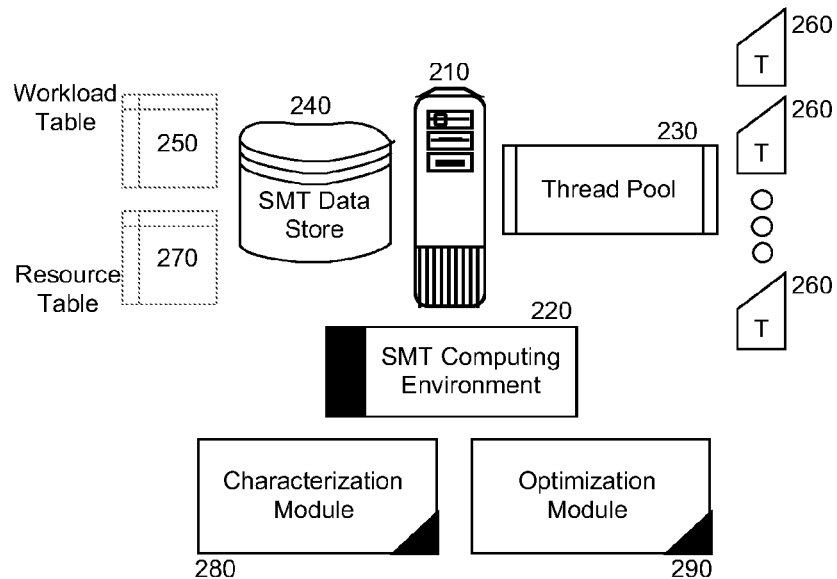
FIG. 2 is a schematic illustration of a parallel computing data processing system configured for dynamic optimization of thread assignments for application workloads in an SMT computing environment; and, FIG. 3 is a flow chart illustrating a process for dynamic optimization of thread assignments for application workloads in an SMT computing environment.

The process shown in FIG. 1 can be implemented within a parallel computing data processing system. In yet further illustration, FIG. 2 schematically shows a parallel computing data processing system configured for dynamic optimization of thread assignments for application workloads in an SMT computing environment. The system can include a host server 210 comprising at least one processor and memory. The host server 210 can support the execution of an SMT computing environment 220 providing access for different threads 260 in a thread pool 230 executing in one or more processor cores to different workloads of an application. A characterization module 280 can be coupled to the SMT computing environment 220.

The characterization module 280 can include program code that when executed in the memory of the host server 210 can monitor and periodically record the operational status of the different processor cores hosting different threads 260 in a resource table 270 disposed in an SMT data store 240. In this regard, the operational status of each processor core can include number of SMT (processing) threads hosted on the core, an identification of each processing thread 260 hosted on it, and one or more measured coefficients of the operational characteristics of the underlying processor core. The program code of the characterization module 280 during execution in the memory of the host server 210 also can monitor and periodically record the operational characteristics of the different workloads in a workload table 250 disposed in the SMT data store 240. In this regard, the operational characteristics can include a measure for each workload both of cycles consumed per instruction (CPI) and a variation in the CPI for the workload from measurement to measurement. The operational characteristics for each workload additionally can include a number of clock ticks consumed for the workload and a frequency of consumption of clock ticks for the workload. Finally, the operational characteristics for each workload can include one or more of the measured coefficients resulting from the operation of the workload.

Of note, an optimization module 290 also can be coupled to the SMT computing environment 220. The optimization module 290 can include program code enabled upon execution in the memory of the host server 210 to review entries in the workload table 250 to identify workloads demonstrating stability according to the variance of CPI consumed by the workloads. Once a workload has been identified as demonstrating operational stability, the program code of the optimization module 290 further can determine the degree of hotness of the workload based upon the number of clock ticks consumed by the workload.

If the workload is considered to be operating at or above a threshold level of activity, the program code of the optimization module 290 can match the operational characteristics of the identified workload to the operational status of the processor cores hosting threads 260 in the thread pool 230 in order to select an available one of the processor cores best able to accommodate the operational characteristics of the identified workload. Thereafter, the identified workload can be assigned to the matched one of the processor cores. To the extent that no one of the processor cores is determined from the resource table 270 to be available for allocation to the identified one of the workloads, the matching of the workloads already assigned to corresponding ones of the processor cores and/or the number of threads hosted(enabled) on one or more of the cores can be re-arranged to optimize the assignment of workloads to threads 260 in the processor cores.

Figure 3:
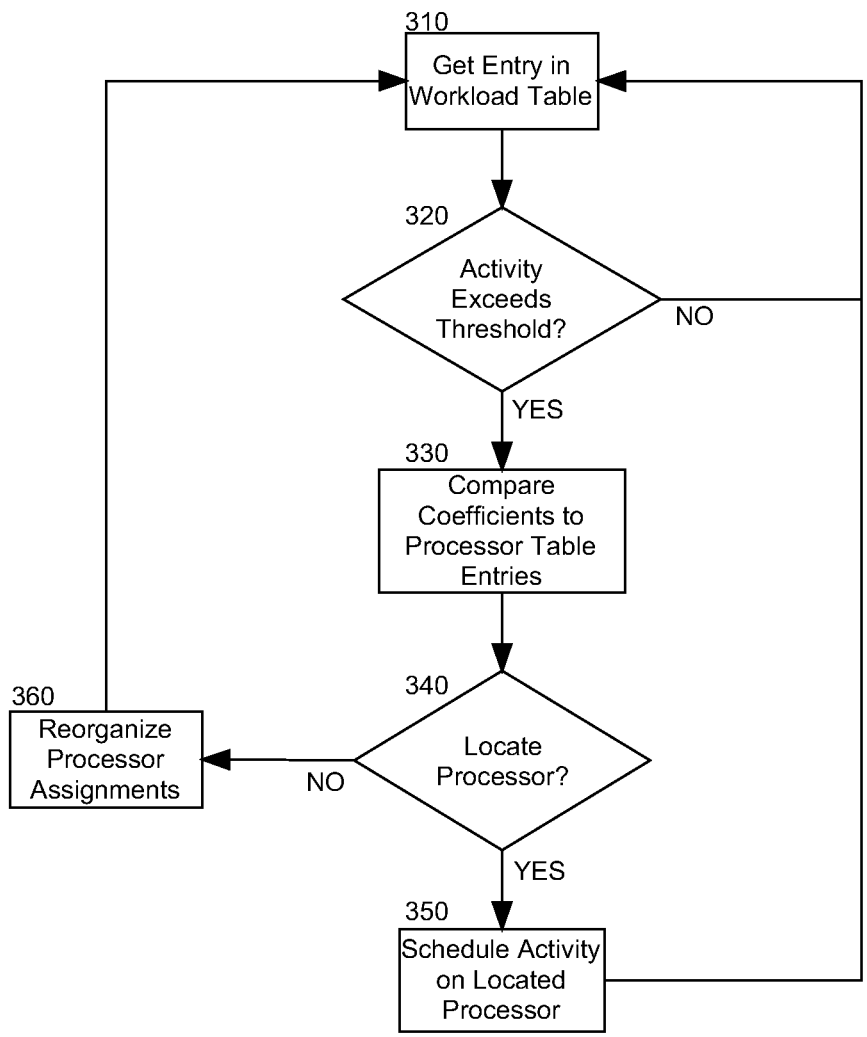

In even yet further illustration of the operation of the optimization module 290, FIG. 3 is a flow chart illustrating a process for dynamic optimization of thread assignments for application workloads in an SMT computing environment. Beginning in block 310, an entry for a workload in the workload table can be reviewed. In decision block 320, it can be determined if the workload has achieved stability of operation (in reference to a reference to variance in measured CPI for the workload), and also a threshold level of activity (in reference to a number of clock ticks consumed for the workload). If not, a next entry in the workload table can be reviewed and the process can repeat. Otherwise, the process can proceed through block 330.

In block 330, the coefficients for the workload can be compared to the coefficients of each entry of an available processor thread in the resource table. In this regard, the coefficients can include characteristics of a workload in such that each characteristic can refer to the utilization of some computing resource on the processor. As such, by way of example, a coefficient can refer to Floating Point Unit (FPU) usage, Fixed Point Unit usage, input/output (I/O) bandwidth consumption, cache and memory access details, to name only a few possibilities. Thus, the coefficients are indicative of the extent to which each workload utilizes or places demands upon the computing resources of a processor.

In decision block 340, it can be determined if any entry in the resource table for an available processor core demonstrates a satisfactory ability to host the execution of the workload in one or more threads. In particular, the coefficients of the workload can be compared to other coefficients of other workloads to ensure that no two workloads are scheduled to the same processor core so as to impart the same processing demands upon the computing resources of the same processor core. Alternatively expressed, workloads are to be scheduled on processor threads hosted on a processor core such that each workload receives satisfaction of a corresponding set of resource requirements without interfering with the resource requirements of other workloads on other threads as much as possible.

In decision block 340, if it is determined that an entry in the resource table indicates an available processor thread able to host the execution of the workload, the workload can be assigned for execution in one or more threads of the identified processor core. Otherwise, in block 360 the existing assignments of different workloads to different processor cores and/or the number of threads hosted(enabled) on one or more of the cores can be re-arranged to account for the contemporaneously measured state of the processor cores and the hotness of different workloads.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A parallel computing data processing system configured for dynamic optimization of thread assignments for application workloads in a simultaneous multi-threading (SMT) computing environment, the system comprising:

a host server comprising memory and at least one processor;

an SMT computing environment executing in the memory of the host server and supporting execution of different workloads in correspondingly different processor cores hosting different threads accessible in a thread pool;

a characterization module comprising program code executing in the memory of the host server, the program code of the characterization module monitoring and periodically recording an operational status of the different processor cores and corresponding threads and also operational characteristics of the different workloads, wherein the operational characteristics include a number of clock ticks consumed by a corresponding one of the workloads, a higher number of clock ticks indicating a higher degree of activity, and a measurement of cycles per instruction (CPI) consumed by a corresponding one of the workloads and a variance in measurements of CPI consumed by the corresponding one of the workloads over time, a lower variance indicating greater operational stability; and an optimization module comprising program code executing in the memory of the host server, the program code of the optimization module identifying by way of the recorded operational characteristics of the different workloads a particular one of the workloads demonstrating both operational stability and a threshold level of activity, matching a recorded operational characteristic of the particular one of the workloads to a recorded status of a processor core best able amongst the different processor cores to host execution in one or more of the threads the particular one of the workloads, and directing the matched processor core to host execution of the particular one of the workloads.

2. The system of claim 1, wherein the program code of the optimization module responds to a determination that no one of the processor cores is available to host the execution of the particular one of the workloads by re-arranging an existing assignment of ones of the different workloads to corresponding ones of the processor cores to optimize matching of the recorded operational characteristics of the ones of the different workloads to the recorded operational status of the processor cores.

3. A computer program product for dynamic optimization of thread assignments for application workloads in a simultaneous multi-threading (SMT) computing environment, the computer program product comprising:

a computer-readable storage medium having computer-readable program code embodied therewith, the computer-readable program code comprising:

computer-readable program code for monitoring and periodically recording an operational status of different processor cores hosting threads accessible in a thread pool of the SMT computing environment and also operational characteristics of different workloads of a computing application executing in the SMT computing environment, wherein the operational characteristics include a number of clock ticks consumed by a corresponding one of the workloads, a higher number of clock ticks indicating a higher degree of activity, and a measurement of cycles per instruction (CPI) consumed by a corresponding one of the workloads and a variance in measurements of CPI consumed by the corresponding one of the workloads over time, a lower variance indicating greater operational stability;

computer-readable program code for identifying by way of the recorded operational characteristics of the different workloads a particular one of the workloads demonstrating both operational stability and a threshold level of activity;

computer-readable program code for matching a recorded operational characteristic of the particular one of the workloads to a recorded status of a processor core best able amongst the different processor cores to host in one or more threads execution of the particular one of the workloads; and computer-readable program code for directing the matched processor core to host execution of the particular one of the workloads.

4. The computer program product of claim 3, further comprising:

computer-readable program code for determining that no one of the processor cores is available to host the execution of the particular one of the workloads; and computer-readable program code for re-arranging an existing assignment of ones of the different workloads to corresponding ones of the processor cores to optimize matching of the recorded operational characteristics of the ones of the different workloads to the recorded operational status of the processor cores.

* * * * *